(12) United States Patent
Koch

(10) Patent No.: US 7,747,105 B2
(45) Date of Patent: Jun. 29, 2010

(54) METHOD FOR THE ROTATION COMPENSATION OF SPHERICAL IMAGES

(75) Inventor: Reinhard Koch, Kronshagen (DE)

(73) Assignee: Christian-Albrechts-Universitaet Zu Kiel, Kiel (DE)

( * ) Notice: Subject to any disclaimer, the term of this patent is extended or adjusted under 35 U.S.C. 154(b) by 912 days.

(21) Appl. No.: 11/545,363

(22) Filed: Oct. 10, 2006

(65) Prior Publication Data

US 2007/0036460 A1 Feb. 15, 2007

Related U.S. Application Data

(63) Continuation-in-part of application No. PCT/DE2005/000613, filed on Apr. 7, 2005.

(30) Foreign Application Priority Data

Apr. 10, 2004 (DE) .................. 10 2004 017 730

(51) Int. Cl.
*G06K 9/32* (2006.01)
*G06K 9/00* (2006.01)
*G06K 9/36* (2006.01)
*G06T 15/00* (2006.01)
*G09G 5/00* (2006.01)

(52) U.S. Cl. .................. 382/293; 382/154; 382/284; 382/285; 382/294; 382/295; 345/419; 345/629

(58) Field of Classification Search .................. 382/293
See application file for complete search history.

(56) References Cited

U.S. PATENT DOCUMENTS 4,736,436 A * 4/1988 Yasukawa et al. .......... 382/154

| 5,786,936 A | 7/1998 | Baumann et al. |
| 5,798,786 A | 8/1998 | Lareau et al. |
| 5,844,602 A | 12/1998 | Lareau et al. |
| 5,883,733 A | 3/1999 | Hwang |
| 6,002,430 A | 12/1999 | McCall et al. |
| 6,088,055 A | 7/2000 | Lareau et al. |
| 2004/0046888 A1 | 3/2004 | Jan et al. |

OTHER PUBLICATIONS

Zhao et al."3D Reconstruction of an Urban Scene from Synthetic Fish-Eye Images", Proceedings of the 4th IEEE Southwest Symposium on Image Analysis and Interpretation, Apr. 2000, pp. 219-223.*
Jung et al., "Camera Trajectory Estimation using Inertial Sensor Measurements and Structure from Motion Results", IEEE Conference on Computer Vision, Dec. 2001, pp. 732-737.*
Geyer et al., "Omnidirectional Video", Visual Computer Journal, vol. 19, 2003, pp. 405-416.*

* cited by examiner

*Primary Examiner*—Matthew C Bella
*Assistant Examiner*—Jose M Torres
(74) *Attorney, Agent, or Firm*—Larson & Larson, P.A.; Frank Liebenow

(57) ABSTRACT

Method for producing a rotation-compensated image sequence allowing simplified reconstruction of the translation of a camera by real time rotation compensation of images recorded sequentially by an electronic camera randomly displaced in a scene and provided with a rotation sensor resulting from an association of color and/or brightness values of the pixels of a camera pixel field indicated by rectangular coordinates.

2 Claims, 3 Drawing Sheets

$x = x_o + k \cdot \vartheta \cdot \cos\varphi, \quad 0 \leq \vartheta < 180°$
$y = y_o + k \cdot \vartheta \cdot \sin\varphi, \quad 0 \leq \varphi < 360°$

METHOD FOR THE ROTATION COMPENSATION OF SPHERICAL IMAGES

PRIOR APPLICATIONS

This application is a continuation-in-part of International Application No. PCT/DE2005/000613, filed on Apr. 7, 2005, which in turn bases priority on German Application No. 10 2004 017 730.9, filed on Apr. 10, 2004.

BACKGROUND OF THE INVENTION

1. Field of Invention

The invention relates to a method for computer-assisted stabilization of images, particularly electronically recorded images (i.e., using a video camera) with respect to rotations of the camera about a random axis and by randomly large angles. The invention also relates to image recording systems using a fisheye lens for (hemi)spherical images, particularly cameras with a 3600 all-around view.

2. Description of the Prior Art

Electronic image stabilization methods are known and can roughly be broken down into two categories, namely (1) compensation devices for the actual camera or for the optical path from object to camera screen and (2) computer-assisted correction of the recorded images, which inter alia presupposes an electronic acquisition of the images and requires reprocessing.

Examples for devices of the first category are described in DE 43 42 717 A1 or DE 196 18 979 A1. These are particularly suitable for compensating blurring in the case of photographs on film material.

However, the second category has also acquired practical significance with modern digital cameras and increased computer capacity. Existing blur compensation methods, such as electronic image stabilization in Handy Cams, can only effect a limited compensation due to the limited angular aperture of perspective cameras, and as a result of perspective transformation the image is distorted. Upon tilting the camera by more than the angular aperture, it is no longer possible to perform any compensation.

It represents a fundamental difficulty of electronic reprocessing that a real image of a (three-dimensional) scene is only acquired by a two-dimensional pixel array. To be able to conclude from a rotation or translation of the camera, which has taken place in the meantime solely from a sequence of images, it is necessary to numerically reconstruct the 3D scene, and even nowadays, this involves considerable effort and expenditure, particularly in real time.

Thus, for the reconstruction of scenes, use of additional external sensors is sometimes made. It is known to equip a camera with a fixed mounted acceleration gyro sensor in order to record the rotation of the camera simultaneously with the images (e.g. Suya You, Ulrich Neumann, and Ronald Azuma: *Orientation Tracking for Outdoor Augmented Reality Registration*, IEEE Computer Graphics and Applications 19, 6 (November/December 1999), 36-42). Through accelerometers (gyroscope principle) the rotation sensor measures the relative change to the 3D orientation between different recording times. In addition, use is made of further absolute measured quantities, such as the magnetic North Pole and gravitation (plumb line) for producing an absolute orientation reference. Through the integration of the relative change over time, an absolute 3D orientation is determined. The sensor rotation can be described by three angles (Rx, Ry, Rz) about the three space axes (X, Y, Z) (Euler angle, see FIG. 1$a$) or by rotating about a rotation axis in space (see FIG. 1$b$, axis-angle representation (A, $\alpha$), also quaternion representation).

This makes it possible to decouple the camera rotation and translation, i.e., both can be determined separately.

A hemispherical image recording system, particularly a camera with a fisheye lens, is also known and forms a hemisphere of the space on a circular disk in the image plane. 2D image representation takes place in angle coordinates over the unit sphere. The image center images the pole of the hemisphere. The spherical surface is parameterized by two angles running along the degree of longitude ($\theta$) and the degree of latitude ($\phi$) of the sphere (see FIG. 2$a$). A point ($\theta$, $\phi$) of the spherical surface is imaged by the spherical imaging on the image plane (x, y), in which ($x_0$, $y_0$) images the pole (optical axis) (see FIG. 2$b$).

For example, U.S. Pat. No. 6,002,430 discloses a spherical image recording system imaging the entire surrounding space, in each case a half-space is recorded by two hemispherical cameras fitted back to back. Due to the non-zero spacing of the two cameras, it is obvious to use fisheye lenses with a 190° viewing angle in order to be able to seamlessly assemble the two images to form a complete all-around image. However, there is always (1) a "dead zone" of the device in the immediate vicinity of the double camera and which cannot be perceived, together with (2) a "near zone" in which the parallax shift of the two cameras is noticeable. The camera center spacing, however, plays no part when the scene points are sufficiently far apart.

In the field of so-called "augmented vision", the aim is to fade additional information into the visual field of people, as in the case of complex operations. The people are equipped with transparent display lenses or spectacles which are able to fade texts or graphics into a real view comparable with the heads-up display (HUD) known from military aircraft. In order to be able to automatically determine the necessary precise knowledge of the position of the lens in 3D space, it is possible to rigidly connect to the lens in all-around viewing cameras. The real time analysis, i.e., the movement of the known marking points in the recorded image, makes it possible to determine the position of the lens in the operating space. However, for external applications, much more complex image analyses are needed to be able to obviate the use of such markings.

It is helpful to be able to separately analyze the rotation and translation influences on the image of the unknown scene. It is therefore obvious to also use rotation sensors here. However, no method has been published as to how it is possible to use additional rotation data for real time rotation stabilization of the spherical image.

The problem of the invention is, therefore, to real time process the electronically recorded image of a spherical camera in such a way that when displayed on a screen (i.e., of a PC) the camera remains invariant with respect to random rotations.

SUMMARY OF THE INVENTION

I have developed a method for producing a rotation compensated image sequence allowing simplified reconstruction of spherical images recorded sequentially by an electronic camera placed randomly in a scene. The camera provided with a rotation sensor for associating color and/or brightness values of the camera pixel field indicated by rectangular or polar coordinates, resulting from a projection of a spherical image from a spherical lens. The method includes the steps of first determining the calibrating matrixes for the spherical lens, then calculating the rotation matrixes from the measured data of the camera rotation sensor. Thereafter, association between the pixel coordinates of the sequential images from the calibrating and rotation matrixes is determined. Thereby, compensating the camera rotation with the associated pixel coordinates. Lastly, reconstruction of the color and/or brightness values of the new to old pixel coordinates relating to the calculated association can be achieved.

BRIEF DESCRIPTION OF THE DRAWINGS

The detailed description of the invention, contained herein below, may be better understood when accompanied by a brief description of the drawings, wherein.

DETAILED DESCRIPTION OF THE INVENTION

The fundamental prerequisite for performing the method according to the invention is the rigid coupling of a spherical camera with a 3DoF (Degree of Freedom) rotation sensor.

In order to simplify explanations, reference is only made hereinafter to a single fisheye camera which images a hemisphere. For all-around viewing, the method is simultaneously used for both cameras, and the inventively stabilized images are then joined together in a known manner.

The camera pixel plane requires a two-dimensional coordinate system in 3D space. The pixel plane orientation is random. Technical CCD chips normally have square pixels in a rectangular arrangement, so the Cartesian coordinate system (x, y) is the natural choice. Its origin is typically in a corner pixel.

Through the spherical projection of the fisheye, object points are imaged on a hemisphere (of radius one) around the camera center on a circular disk in the pixel plane. The natural coordinates of the image are then planar polar coordinates (r,φ). The optical camera axis is perpendicular to the pixel plane through a central pixel with coordinates $(x_0, y_0)$. Each object point on the hemisphere appears under an angle (θ) to the optical axis and is also characterized by its azimuth (φ) position. The fixing of φ=0 is arbitrary.

Figure 1A:
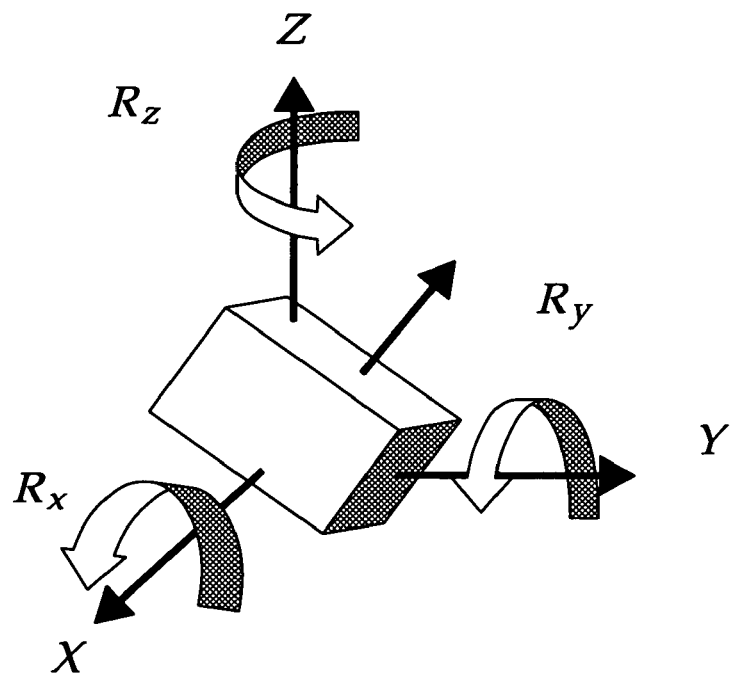
FIG. 1a) illustrates camera rotation by means of three Euler angles (Rx, Ry, Rz) rotating about three space axes (X, Y, Z)
Figure 1B:
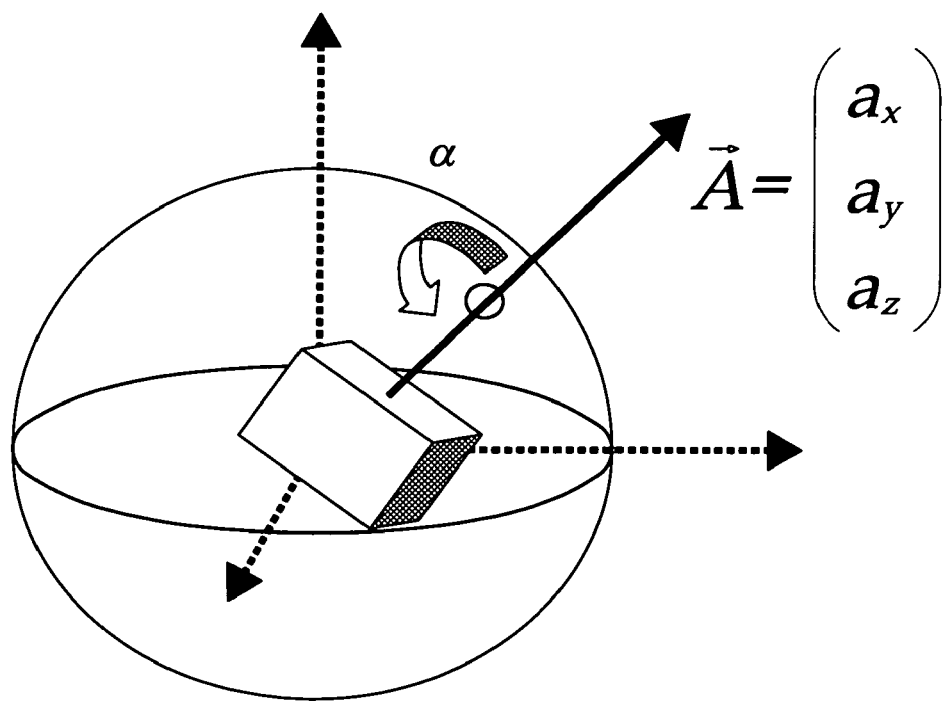
FIG. 1b) illustrates camera rotation by means of axis-angle coordinates through quaternion representation.
Figure 2A:
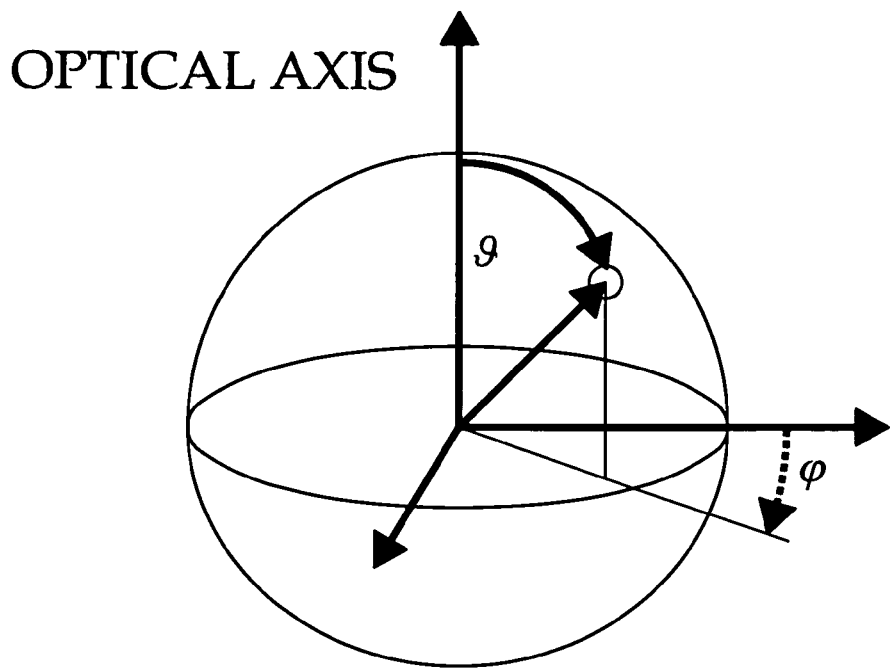
FIG. 2a) illustrates a diagrammatic representation of the hemispherical geometry.
Figure 2B:
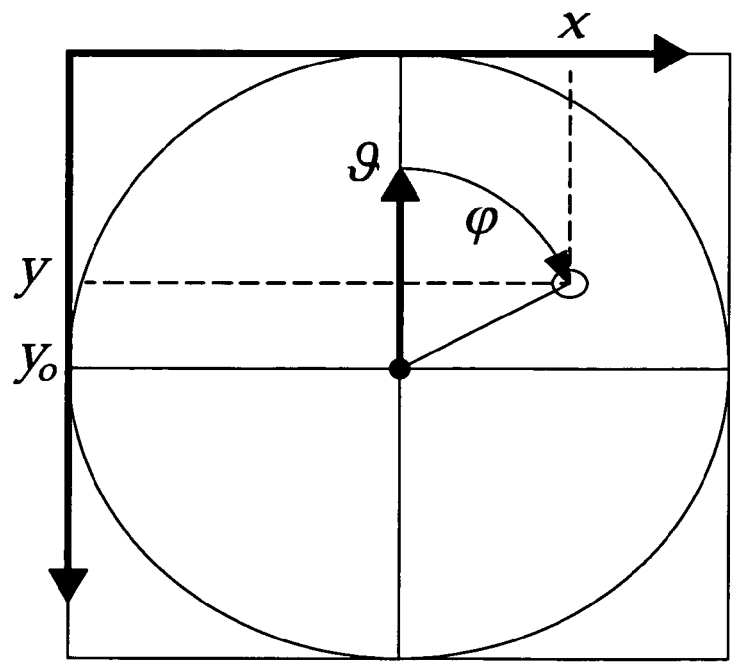
FIG. 2b) illustrates a two-dimensional representation of FIG. 2a) shown with specified coordinates.
Figure 3:
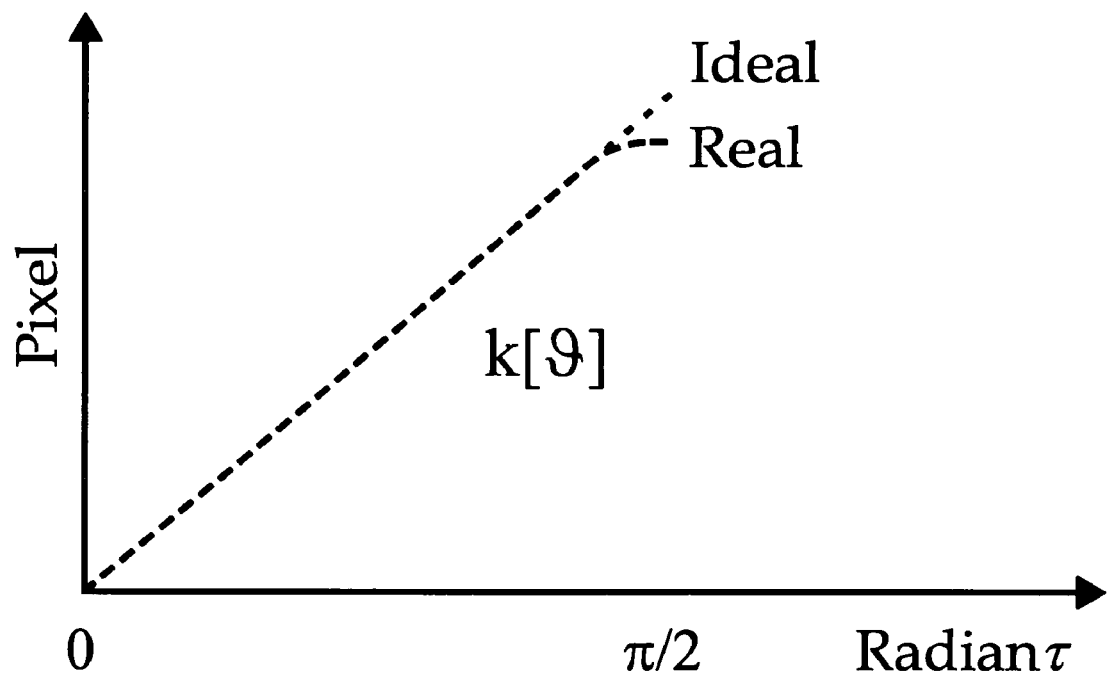
FIG. 3 illustrates a diagrammatic curve of the calibration function k(θ) of a camera fisheye lens.

The special nature of fisheye projection is that ideally the angle (θ) is linearly imaged on the circular disk radius. In practice this is very readily fulfilled for small angles, but for θ→90° imaging is typically non-linear. FIG. 3 shows in exemplified manner the calibrating function k(θ), which indicates the particular conversion factor of angles (e.g. radians) on pixel coordinates and has to be determined once for each lens.

Due to the aforementioned linearity, the spherical image can be described by the polar coordinates (θ,φ).

On ignoring the discreet pixel problem, an object point on the hemisphere at coordinates (θ,φ) in the pixel plane has the pixel coordinates:

$$x_p = x_0 + k(\theta) \times \theta \cos(\varphi) \text{ and } y_p = y_0 + k(\theta) \times \theta \sin(\varphi) \quad (1)$$

If on rotating the camera the object angle coordinates change, e.g. from (θ,φ) to (θ',φ'), then the object image also moves from $(x_P, y_P)$ to $(x_P', y_P')$. On leaving the permitted pixel coordinates, the CCD chip, then as a result of camera rotation, the object has passed out of the field of view. However, it is then certainly in the field of view of the second, rearwardly directed camera.

The principle of the inventive image stabilization consists of the direct calculation of the coordinate shifts $(x_p, y_p) \to (x_p', y_p')$ for all the image points from additional rotation data and in the canceling thereof by recopying the color values of $(x_p', y_p')$ to $(x_p, y_p)$. This recopying is nowadays implemented in all standard graphic cards and optimized for real time applications, e.g. for rotating a virtual camera in a computer-generated space.

Thus, the invention deals solely with the imaging $(x_p, y_p) \to (x_p', y_p')$, which is to be rapidly determined from a rotation sensor data. As the camera rotation can be naturally described by a 3×3 rotation matrix, it is appropriate to formulate the problem three-dimensionally and for this purpose additionally a z-axis is defined along the optical axis, i.e. perpendicular to the pixel plane. Moreover, a z'-axis is introduced into the rotated camera coordinate system and it is possible to write $$\vec{p}_P' = \begin{pmatrix} x_P' \\ y_P' \\ 1 \end{pmatrix} = \underline{M} \begin{pmatrix} x_P \\ y_P \\ 1 \end{pmatrix} = \underline{M}\vec{p}_P. \quad (2)$$

In the above M=M(θ',φ',θ,φ) is a 3×3 matrix, which is dependent on the new and old angle coordinates of the object point on the hemisphere after and before camera rotation. The invention now provides a way of rapidly obtaining this matrix, which is important for real time image stabilization.

Equations (1) can be summarized as a matrix equation $$\vec{p}_P = \begin{pmatrix} x_P \\ y_P \\ 1 \end{pmatrix} = \begin{pmatrix} k(\vartheta) & 0 & x_0 \\ 0 & k(\vartheta) & y_0 \\ 0 & 0 & 1 \end{pmatrix} \begin{pmatrix} \vartheta\cos\varphi \\ \vartheta\sin\varphi \\ 1 \end{pmatrix} = \underline{K}(\vartheta)\vec{p}_i, \quad (3)$$

in which K is a 3×3 calibrating matrix (with calibration function k(θ) and $\vec{p}_i$ is the standard representation of the pixel point $(x_p, y_p)$ in polar coordinates (θ,φ). The matrix K is only to be set up and stored once for all θ. It is always invertible and the standard representation $$\vec{p}_i = K^{-1}(\theta)\vec{p}_P \quad (4)$$

has the advantage that the 3D-position $\vec{p}$ of the associated object point on the hemisphere can be indicated directly from the angle coordinates and therefore from the standard representation. According to the known definition of spherical polar coordinates for the unit sphere we obtain $$\vec{P} = \begin{pmatrix} P_x \\ P_y \\ P_z \end{pmatrix} = \begin{pmatrix} \sin\vartheta\cos\varphi \\ \sin\vartheta\sin\varphi \\ \cos\vartheta \end{pmatrix} = \quad (5)$$

$$\begin{pmatrix} si(\vartheta) & 0 & 0 \\ 0 & si(\vartheta) & 0 \\ 0 & 0 & \cos\vartheta \end{pmatrix} \begin{pmatrix} \vartheta\cos\varphi \\ \vartheta\sin\varphi \\ 1 \end{pmatrix} = \underline{A}(\vartheta)\vec{p}_i = \underline{A}(\vartheta)\underline{K}^{-1}(\vartheta)\vec{p}_P$$

with $$si(\vartheta) = \frac{\sin\vartheta}{\vartheta},$$

so that A(θ) is an invertible matrix for θ≠90°, 180°.

Case θ=180° is excluded here through the aforementioned specification of a hemispherical camera. It would admittedly be possible to image a 360° all-around view on a single circular disk, but this would be disadvantageous due to the distortions associated therewith. In particular, the rear pole of the object sphere, i.e. at θ=180°, would be imaged on the entire edge of the circular disk.

However, case θ=90° can occur and due to $(A^{-1})_{zz}=1/\cos\theta$ leads to an undefined (infinite) matrix component. However, this component is only an artifact of the description. It can be taken away during implementation and its origin is indicated hereinafter.

After setting up the equation (5) it is particularly advantageous to multiply the exact known matrix function A(θ) from the outset with the matrix $K^{-1}(\theta)$ to be determined only once and to store it in a table for all θ. The product matrix A $K^{-1}$ can also be inverted with $$(AK^{-1})^{-1}=KA^{-1} \quad (6)$$

and should be calculated in this way and tabulated.

During camera rotation the rotation sensor immediately supplies measured data for the angles rotated about each of the axes with typical clock rates of 100 to 200 measurements per second, an angular resolution of typically 0.050 and a short-term precision of 0.1 to 0.3°. From this it is immediately possible to set up in per se known manner a 3×3 rotation matrix, which commits the coordinate transformation of a random point in space into the now rotated, camera-linked coordinate system. This also applies to each object point of the unit sphere, particularly for $\vec{P}$. In the rotated coordinate system it has the representation $$\vec{P}'=R\vec{P} \quad (7)$$

and as equation (5) naturally also applies in the rotated coordinate system, we obtain $$\vec{p}'_P=K(\theta')A^{-1}(\theta')\vec{P}'=K(\theta')A^{-1}(\theta')RA(\theta)K^{-1}(\theta)\vec{p}_P$$

Comparison with equation (2) shows that the matrix M occurring there is identical to the matrix product in equation (8). This is effectively calculated as a product from 3×3 matrixes for each pixel, namely two tabulated matrixes and a measured rotation matrix, which applies to the entire image at a fixed point in time.

Equation (8) also explains how the infinite matrix component $(A^{-1})_{zz}$ arises. An object point $\vec{P}$ at θ'=90° is located in the camera center plane about which rotation has taken place, i.e. at $P'_z=0$. Also $$\vec{p}'_P = \underline{K}(\vartheta')\underline{A}^{-1}(\vartheta')\vec{P}' \text{ with } \vec{p}'_P = \begin{pmatrix} x'_P \\ y'_P \\ 1 \end{pmatrix}, \quad (8')$$

which only applies if $(A^{-1})_{zz}$ is striving towards infinity. The choice of the z-component one on elevating the pixel coordinates into the third dimension is an arbitrary, but comfortable fixing in equation (2) and gives rise to the description problem for θ'=90°.

The execution of the 3×3 matrix products can nowadays take place at a very high speed with modern hardware implementation. Through the precalculation of the mapping in tables the rotation compensation of the image can be performed in real timable manner, i.e. keeping step with the clock rate of image recording. Typical image recording rates are 15 to 30 images per second. With the aid of this mapping the color values can be read from their new positions and recopied to their old positions.

On rotating the camera about the camera center, in the absence of camera translation, there is a static, spherical image in the computer and optionally on the monitor. If the camera center position is additionally modified, the image reveals a rotation-free scene shift from which the translation state of the camera can be reconstructed in simplified form.

If image stabilization is to take place particularly rapidly or if very large images have to be stabilized, in an advantageous embodiment of the inventive method mapping is to be performed for only a selection and not all of the pixels. On more particularly choosing the node points of a "triangular mesh" network placed above the image, admittedly initially only the network points are recopied, but modern graphic cards also have a so-called "Fragment Shader" which is able to interpolate color values between known support points. This is typically used in the texturing of computer graphics. In many applications (particularly in the field of human vision) it will not be a matter of the pixel-precise stabilization of the image, so that the reduction of the method to a few network nodes can lead to significant speed advantages.

The invention claimed is:

1. Method for producing a rotationally-compensated image sequence allowing for a simplified reconstruction of images to be recorded sequentially by an electronic camera randomly moved in a scene, the method provided with a rotation sensor and which results from an association of color and/or brightness values of pixels of a camera pixel field indicated by rectangular coordinates, the steps of the method comprising:
   a) using polar coordinates of a fisheye projection of a spherical image of a spherical lens;
   b) determining calibrating matrixes for the spherical lens;
   c) calculating rotation matrixes that describe a relative camera rotation, said rotation matrixes determined from measured data of said rotation sensor;
   d) calculating an association between pixel coordinates of an image point in successive images from said calibrating matrixes and said rotation matrixes;
   e) calculating pixel coordinates of at least node points in a triangular mesh corresponding to the calculated association while compensating camera rotation; and
   f) re-copying said color and/or brightness values of new to old pixel coordinates corresponding to said calculated association.

2. The method according to claim 1, further comprising:
   a) providing a second camera; and
   b) imaging a remaining hemispherical angle that is directly counter to a first camera imaging, said remaining hemispherical angle being a 180 degree hemispherical angle.

* * * * *